United States Patent
Hirate et al.

(10) Patent No.: US 9,855,967 B2
(45) Date of Patent: Jan. 2, 2018

(54) STEERING CONTROL APPARATUS

(71) Applicant: DENSO CORPORATION, Kariya, Aichi-pref. (JP)

(72) Inventors: Yosuke Hirate, Kariya (JP); Motoaki Kataoka, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/939,716

(22) Filed: Nov. 12, 2015

(65) Prior Publication Data

US 2017/0137055 A1 May 18, 2017

(51) Int. Cl.
| | | |
|---|---|---|
| B62D 5/04 | (2006.01) | |
| B62D 5/00 | (2006.01) | |
| B62D 6/00 | (2006.01) | |
| B62D 6/10 | (2006.01) | |

(52) U.S. Cl.
CPC ......... B62D 5/0463 (2013.01); B62D 5/0466 (2013.01); B62D 6/002 (2013.01); B62D 6/008 (2013.01); B62D 5/001 (2013.01); B62D 5/008 (2013.01); B62D 6/10 (2013.01)

(58) Field of Classification Search
None
See application file for complete search history.

(56) References Cited

U.S. PATENT DOCUMENTS

| | | | |
|---|---|---|---|
| 6,450,287 B1 | 9/2002 | Kurishige et al. | |
| 6,687,588 B2 * | 2/2004 | Demerly | B62D 5/001 |
| | | | 180/402 |
| 7,520,365 B2 * | 4/2009 | Fukuba | B62D 6/008 |
| | | | 180/402 |
| 8,116,943 B2 * | 2/2012 | Feller | B62D 5/008 |
| | | | 180/400 |

(Continued)

FOREIGN PATENT DOCUMENTS

| | | |
|---|---|---|
| JP | 2001-122146 A | 5/2001 |
| JP | 2005-88754 A | 4/2005 |

(Continued)

OTHER PUBLICATIONS

English translation of JP2014213781, accessed May 1, 2017 via Espacenet.*

*Primary Examiner* — Krishnan Ramesh
(74) *Attorney, Agent, or Firm* — Knobbe, Martens, Olson & Bear, LLP

(57) ABSTRACT

A steering control apparatus controls includes a steering quantity generation unit generating a steering quantity indicative of an operation performed on the steering member, an adjustment torque generation unit generating an adjustment torque and adjusting a mechanical impedance corresponding to the adjustment torque, and a command value generation unit generating a command value and controlling the motor according to the command value using the adjustment torque generated by the adjustment torque generation unit. The steering quantity is a physical quantity (Continued)

that has different values at least in a state of rotating the steering member, a state of returning the steering member, or a state of retaining the steering member, and the steering quantity indicates an operation amount of rotating the steering member or an operation amount of returning the steering member.

10 Claims, 7 Drawing Sheets

(56) References Cited

U.S. PATENT DOCUMENTS

| | | | |
|---|---|---|---|
| 8,996,251 B2 | 3/2015 | Kataoka et al. | |
| 2003/0055546 A1* | 3/2003 | Demerly | B62D 5/001 701/42 |
| 2003/0150366 A1* | 8/2003 | Kaufmann | B63B 39/061 114/144 RE |
| 2007/0219691 A1* | 9/2007 | Fukuba | B62D 6/008 701/42 |
| 2009/0271070 A1* | 10/2009 | Feller | B62D 5/008 701/41 |
| 2011/0071729 A1* | 3/2011 | Oblizajek | B62D 5/0472 701/41 |

FOREIGN PATENT DOCUMENTS

| | | |
|---|---|---|
| JP | 4103747 B2 | 6/2008 |
| JP | 4232471 B2 | 3/2009 |
| JP | 2013-52793 A | 3/2013 |

* cited by examiner

STEERING CONTROL APPARATUS

CROSS REFERENCE TO RELATED APPLICATION

This application is based on Japanese Patent Application No. 2013-093848 filed on Apr. 26, 2013, the disclosures of which is incorporated herein by reference.

TECHNICAL FIELD

The present disclosure relates to a steering control apparatus that adjusts a steering feel sensed by a driver by properly providing an assist torque.

BACKGROUND

As disclosed in JP 4232471 B2, there is conventionally known a steering control apparatus that provides assistance to steering force applied to a steering member of a vehicle. The steering control apparatus in JP 4232471 B2 performs a first control and a second control. The first control is exercised to drive a steering assist motor, which generates an assist steering torque, on the basis of a detected steering torque. Hereinafter, the assist steering torque is referred to as an assist torque for simplification. The second control is exercised to drive the steering assist motor on the basis of the difference between the detected steering torque and a target steering torque. The target steering torque is estimated based on a detected steering angle and a detected vehicle speed.

As a result, the steering control apparatus is possible to switch an operation between the first control and the second control. As described above, the first control is exercised to drive the vehicle by providing a steering torque based on road surface conditions. The second control is exercised to drive the vehicle by providing a predetermined steering torque irrespective of the road surface conditions. Further, the second control is exercised to generate the target steering torque by using a standard steering model defining the relationship between the steering angle and steering torque of the steering member. The second control is also exercised to vary mechanical impedance, which characterizes the standard steering model, on the basis of the steering angle and a vehicle speed.

It is known that a driver is capable of determining vehicle conditions from steering feel by tactile sense. However, the first control, which is based only on road surface load, may fail to provide a finely adjusted steering feel corresponding to the steering operation performed by the driver.

Further, the second control refers to the steering angle and the vehicle speed as parameters for varying the mechanical impedance. Herein, the mechanical impedance is transferred to the driver as the steering feel. Therefore, in various steering states that may occur during an actual driving, the second control may also fail to provide a finely adjusted steering feel corresponding to the steering operation performed by the driver. Herein, various steering states that may occur during an actual driving includes, for example, rotating a steering wheel toward a direction in normal rotation speed, rotating back the steering wheel from the rotated direction, retaining or holding the steering wheel without rotation, or rapidly rotating the steering wheel. Hereinafter, rotating back of the steering wheel from the rotated state may also be referred to as returning the steering wheel for distinguishing the rotating from the rotating back.

SUMMARY

In view of the foregoing difficulties, it is an object of the present disclosure to provide a steering control apparatus that adjusts a steering feel corresponding to a steering state of a steering member.

According to an aspect of the present disclosure, a steering control apparatus controls steering characteristics by controlling a motor to output an assist torque. The assist torque is generated corresponding to a steering torque applied to a steering axis that is coupled to a steering member. The steering control apparatus includes a steering quantity generation unit, an adjustment torque generation unit, and a command value generation unit. The steering quantity generation unit generates a steering quantity indicative of an operation performed on the steering member. The adjustment torque generation unit generates an adjustment torque and adjusts mechanical impedance corresponding to the adjustment torque. The mechanical impedance defines a relationship between a steering torque of the steering axis and a steering angle of the steering axis corresponding to the steering quantity generated by the steering quantity generation unit. The command value generation unit generates a command value and controls the motor according to the command value using the adjustment torque generated by the adjustment torque generation unit. The steering quantity is a physical quantity that has different values at least in a state of rotating the steering member, a state of returning the steering member, or a state of retaining the steering member. The steering quantity indicates an operation amount of rotating the steering member or an operation amount of returning the steering member.

The above steering control apparatus uses the steering quantity as a parameter for varying the mechanical impedance. Thus, the driver can be provided with a steering feel corresponding to the steering state of the steering member using a simple control scheme.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The following will describe embodiments of the present disclosure with reference to the accompanying drawings.

Figure 1:
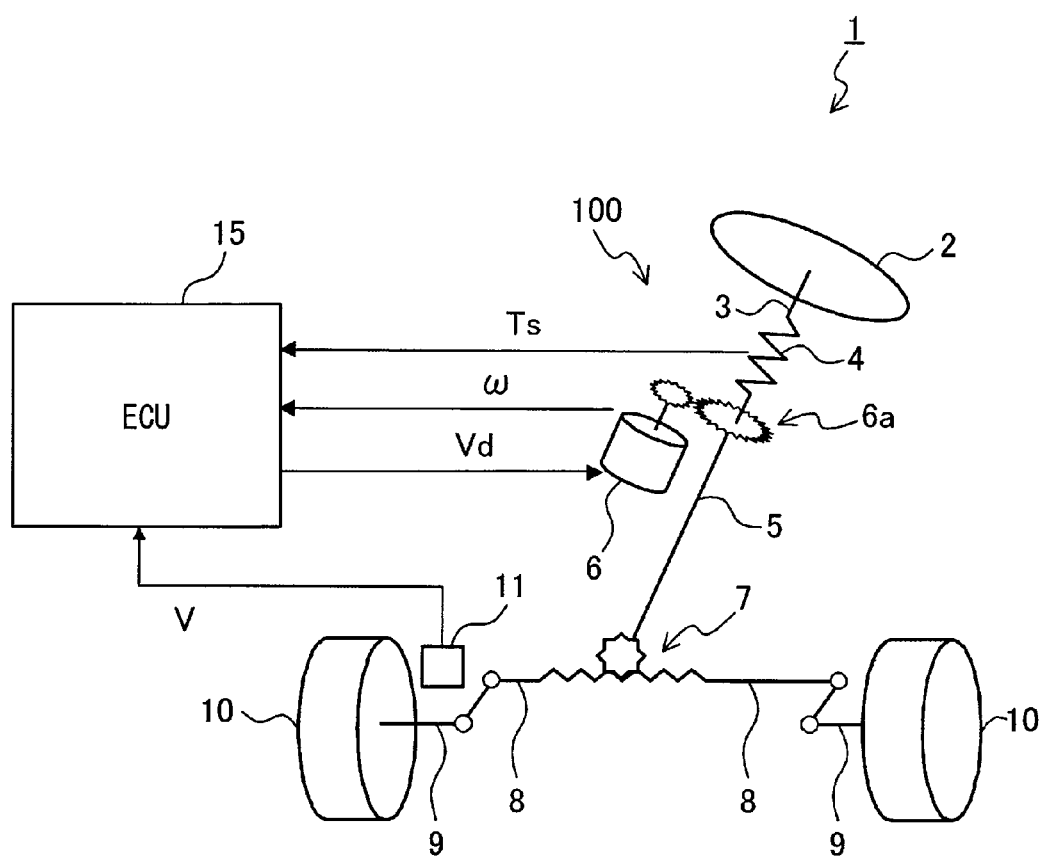
FIG. 1 is a schematic diagram illustrating a configuration of an electric power steering system.

As illustrated in FIG. 1, an electric power steering system 1 for a vehicle uses a motor 6 to provide assistance to a steering operation made by a driver on a steering member. In FIG. 1, a steering wheel 2 is provided as an example of the steering member. The steering wheel 2 is fixed at one end of a steering shaft 3. The other end of the steering shaft 3 is connected to one end of a torque sensor 4. The other end of the torque sensor 4 is connected to an intermediate shaft 5. In the following description, the entire shaft assembly, which includes the steering shaft 3, the torque sensor 4, and the intermediate shaft 5, may be collectively referred to as a steering axis. Further, a rotation angle of the steering axis may be referred to as a steering angle, a rotational angular speed of the steering axis may be referred to as a steering speed, and a rotational angular acceleration of the steering axis may be referred to as a steering acceleration or an angular acceleration.

The torque sensor 4 detects a steering torque Ts. More specifically, the torque sensor 4 includes a torsion bar that couples the steering shaft 3 to the intermediate shaft 5. The torque sensor 4 detects a torque applied to the torsion bar on the basis of a torsion angle of the torsion bar.

The motor 6 provides assistance to a steering force for operating the steering wheel 2. The rotation of the motor 6 is transmitted to the intermediate shaft 5 through a speed reduction mechanism 6a. More specifically, the speed reduction mechanism 6a includes a worm gear and a worm wheel. The worm gear is attached to an end of a rotation shaft of the motor 6. The worm wheel is in mesh with the worm gear and coaxially attached to the intermediate shaft 5. As the speed reduction mechanism 6a is configured as described above, the rotation of the motor 6 is transmitted to the intermediate shaft 5. On the contrary, when the intermediate shaft 5 is rotated by an operation applied to the steering wheel 2 or by a reaction force generated by a road surface, the rotation of the intermediate shaft 5 is transmitted to the motor 6 through the speed reduction mechanism 6a and the motor 6 rotates corresponding to the rotation of the intermediate shaft 5.

In the present embodiment, the motor 6 is a brushless motor that includes a resolver or other rotation sensor, which is capable of outputting a rotational state of the motor 6. The rotation sensor of the motor 6 in the present embodiment is capable of outputting at least a motor speed ω as information related to the rotational state of the motor 6. The motor speed ω is an example of information indicative of a rotational angular speed of the motor 6. A steering speed, which is obtained by multiplying the motor speed ω by a gear ratio of the speed reduction mechanism 6a, may be used instead of the motor speed ω.

In the intermediate shaft 5, one end is connected to the torque sensor 4 and opposing other end is connected to a steering gear box 7. The steering gear box 7 is provided by a gear mechanism that includes a rack and a pinion gear. The pinion gear is attached to the end of the intermediate shaft 5, and teeth of the rack mesh with the pinion gear. Therefore, when a driver rotates the steering wheel 2, the intermediate shaft 5 rotates, that is, the pinion gear rotates, and the rotation of the pinion gear drives the rack to move leftward or rightward. Tie rods 8 are respectively attached to both ends of the rack. Each tie rod 8 reciprocates leftward and rightward together with the rack, pulling and pushing a knuckle arm 9 that is connected with the tie rod 8 at the other end. This configuration changes an orientation of each tire 10, which is attached to a steered wheel.

The vehicle includes a vehicle speed sensor (VH SPEED SENSOR) 11 disposed at a predetermined portion of the vehicle to detect a vehicle speed V.

When the driver rotates the steering wheel 2 for steering purpose, the above-described configuration transmits the rotation of the steering wheel 2 to the steering gear box 7 through the steering shaft 3, the torque sensor 4, and the intermediate shaft 5. In the steering gear box 7, the rotation of the intermediate shaft 5 is converted to left-right motion of the tie rod 8. This motion of the tie rod 8 steers both the left and right tires 10.

The vehicle further includes an electronic control unit (ECU) 15 functioning as the steering control apparatus in the present disclosure. The ECU 15 operates using electric power supplied by an in-vehicle battery (not shown). The ECU 15 calculates an assist torque command Ta on the basis of the steering torque Ts detected by the torque sensor 4, the motor speed ω of the motor 6, and the vehicle speed V detected by the vehicle speed sensor 11. A drive voltage Vd corresponding to the calculation result of the assist torque command Ta is applied to the motor 6 in order to control an assistance torque amount to be provided to the driver for rotating the steering wheel. That is, the drive voltage Vd is applied to the motor 6 in order to assist a force for steering both tires 10.

In the present embodiment, the motor 6 is a brushless motor. Therefore, the drive voltage Vd outputted from the ECU 15 and applied to the motor 6 has three components corresponding to three-phase (including U-phase, V-phase, and W-phase). The three components include Vdu, Vdv, and Vdw. A rotational torque of the motor 6 is controlled by applying the three-phase drive voltage components Vdu, Vdv, Vdw outputted from the ECU 15 to the motor 6. The applying of the three-phase drive voltage components Vdu, Vdv, Vdw to the motor 6 is achieved by flowing three-phase drive currents to the motor 6. A method of driving a brushless motor with three-phase drive voltages, for example, a PWM drive method and a drive circuit for generating the three-phase drive voltages, for example, a three-phase inverter are well known arts and will not be described in detail here.

The ECU 15 controls the motor 6 by directly controlling the drive voltages Vd to be applied to the motor 6. However, it can be said that control of the motor 6 results in a control of a steering mechanism 100, which is a control target driven by the motor 6. It can therefore be said that the ECU 15 controls the steering mechanism 100. The steering mechanism 100 is an overall mechanism illustrated in the steering system configuration of FIG. 1 except for the ECU 15. That is, the steering mechanism 100 includes an overall mechanism for transmitting the steering force applied to the steering wheel 2 to each tire 10.

Figure 2:
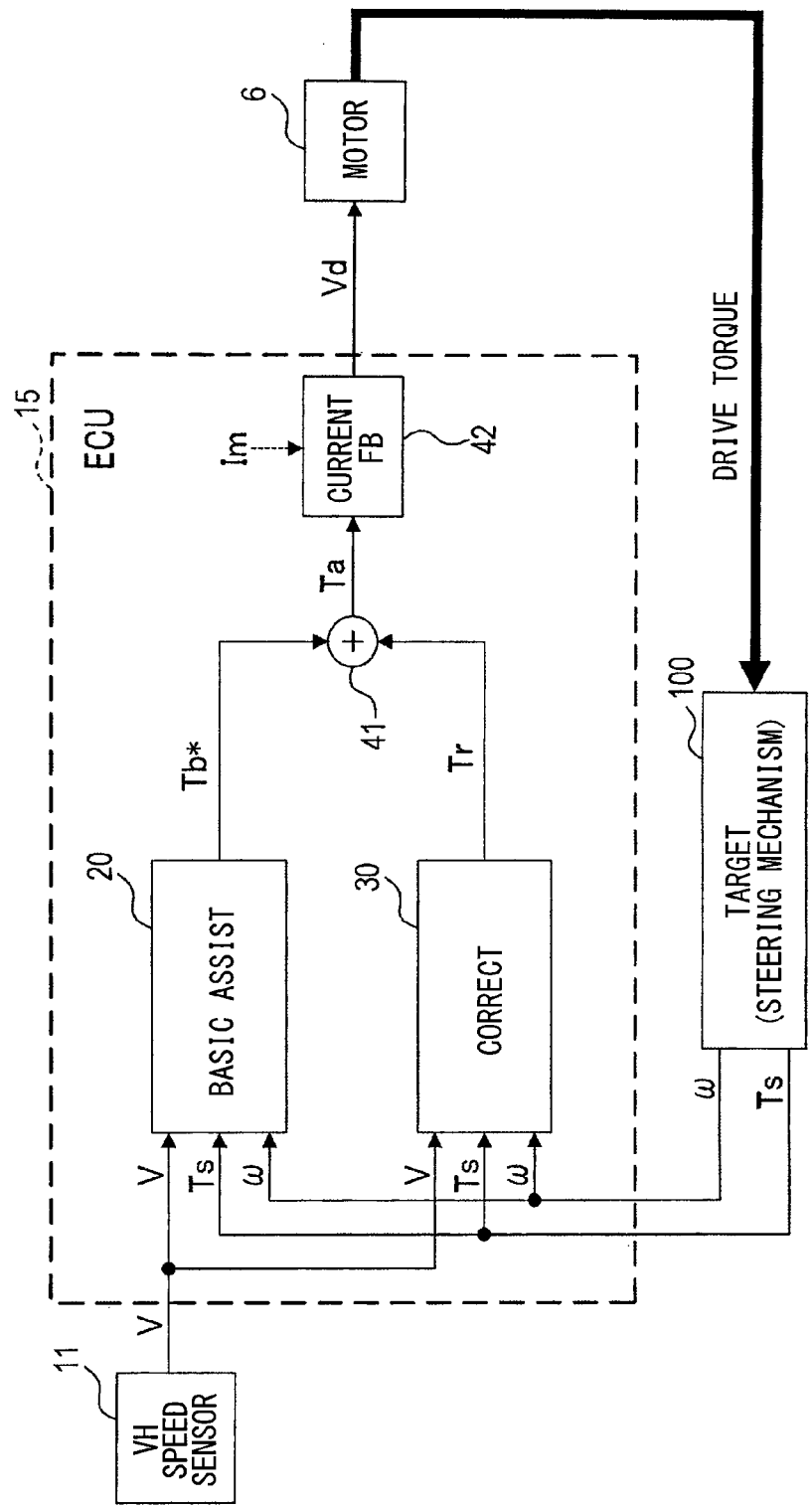
FIG. 2 is a schematic diagram illustrating a configuration of a control mechanism of an electronic control unit.

The schematic block diagram of FIG. 2 illustrates a configuration of the ECU 15. The ECU 15 also functions as a control mechanism. In practical use, a predetermined control program executed by a CPU (not shown) of the ECU 15 provides elements 20, 30, 41 of the ECU 15. Further, the predetermined control program executed by the CPU of ECU 15 may also provide partial functions of a current feedback (FB) unit 42 included in the ECU 15. The current FB unit 42 may be separated from the CPU or may be integrated with the CPU. In other words, functional blocks in FIG. 2 represent various functions implemented by the CPU. As described above, implementation of the control mechanism illustrated in FIG. 2 may be provided by software method. As another example, the whole or part of the control mechanism illustrated in FIG. 2 and other drawings may be implemented by a logic circuit or other circuits in hardware method.

As illustrated in FIG. 2, the ECU 15 includes a basic assist unit (BASIC ASSIST) 20, a correction unit (CORRECT) 30, an adder 41, and a current feedback unit (CURRENT FB) 42. The basic assist unit 20 generates a basic assist command Tb*. The correction unit 30 generates a correction torque command Tr. The adder 41 generates an assist torque command Ta by adding the correction torque command Tr to the basic assist command Tb*. The current FB unit 42 energizes and drives the motor 6 by applying the drive voltage Vd to the motor 6 corresponding to the assist torque command Ta.

The basic assist unit 20 implements characteristics of a steering reaction force on the basis of road surface reaction force (road surface load). More specifically, the basic assist unit 20 permits a reaction (reaction force) corresponding to the road surface load to be quasi-steadily transmitted to the driver so that the driver is able to easily grasp a state of the vehicle and a state of the road surface. The basic assist unit 20 also provides improved steering feel by adjusting the sense of touch, which includes hardness, stickiness, and heaviness of tires felt via the steering wheel. Herein, the sense of touch is transmitted to the driver corresponding to a steering state. Based on the steering torque Ts, the motor speed ω, and the vehicle speed V, the basic assist unit 20 generates the basic assist command Tb* to assist the operation of the steering wheel 2. By the basic assist command Tb*, a force generated by the road surface load can be transmitted to the driver in a sensible manner and a steering feel corresponding to the steering state can be provided to the driver.

The correction unit 30 provides operation stability of the overall vehicle. Herein, operation stability is one of the vehicle motion characteristics. More specifically, the correction unit 30 suppresses unstable behavior, for example, oscillatory behavior transmitted to the steering wheel due to unstable behavior of the vehicle for the purpose of permitting the vehicle to behave as desired, for example, permitting each wheel 10 to behave as desired. More specifically, the correction unit 30 suppresses unstable behavior for permitting the vehicle to achieve convergence in an appropriate manner. Based on the steering torque Ts, the motor speed ω, and the vehicle speed V, the correction unit 30 generates the correction torque command Tr to suppress or converge the aforementioned unstable behavior of the vehicle.

The adder 41 generates the assist torque command Ta by adding the correction torque command Tr, which is generated by the correction unit 30, to the basic assist command Tb*, which is generated by the basic assist unit 20.

The current FB unit 42 applies the drive voltage Vd to the motor 6 on the basis of the assist torque command Ta so that an assist torque, that is, an assist steering force corresponding to the assist torque command Ta is provided to the steering axis, more specifically, to a portion between the torque sensor 4 and the tires 10. Based on the assist torque command Ta, the current FB unit 42 sets a target current (phase-specific target current) to be applied to each phase of the motor 6. The current FB unit 42 then detects and feeds back the current Im applied to each phase, and generates a desired assist torque for the steering axis by controlling the drive voltage Vd, that is, controlling the current Im in such a manner that the detected value, that is, the current Im applied to each phase agrees becomes equal to the target current.

The correction unit 30 and the current FB unit 42 are well-known technologies. For example, refer to JP 5533822 B2 (corresponding to U.S. Pat. No. 8,996,251 B2), and details related to the correction unit 30 and the current FB unit 42 will not be described. The following will describe the basic assist unit 20, which relates to an essential portion of the present disclosure, in detail.

Figure 3:
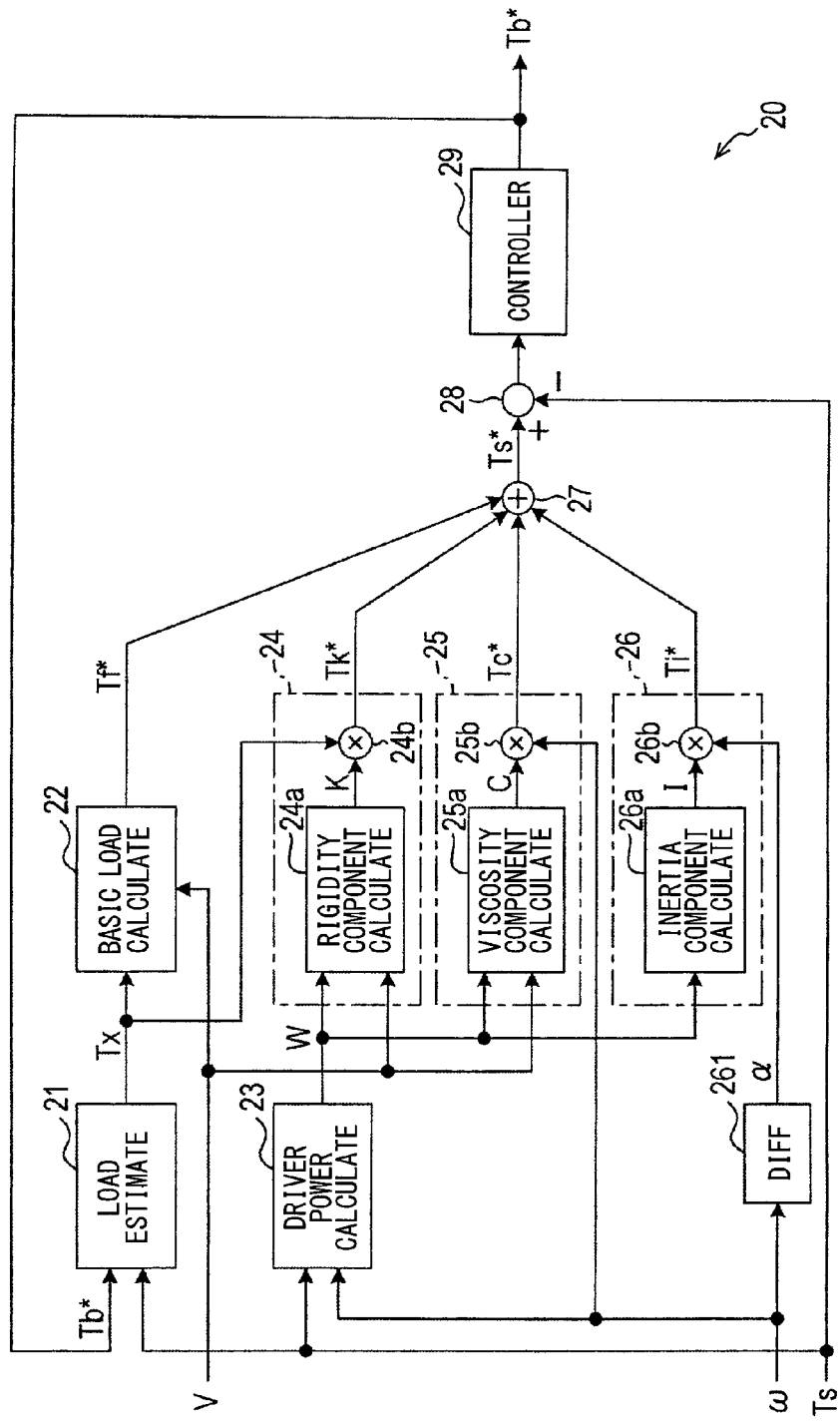
FIG. 3 is a diagram illustrating a configuration of a basic assist unit.

As illustrated in FIG. 3, the basic assist unit 20 includes a load estimator (LOAD ESTIMATE) 21, a basic load quantity calculator (BASIC LOAD CALCULATE) 22, a driver power calculator (DRIVER POWER CALCULATE) 23, a rigidity adjustment amount calculator 24, a viscosity adjustment amount calculator 25, an inertia adjustment amount calculator 26, a differentiator (DIFF) 261, a target calculator 27, a deviation calculator 28, and a controller 29. The driver power calculator 23 functions as a steering quantity generation unit which generates a driver power as a steering quantity indicative of an operation performed on the steering member. The rigidity adjustment amount calculator 24, the viscosity adjustment amount calculator 25, and the inertia adjustment amount calculator 26 together with each other function as an adjustment torque generation unit which generates adjustment torque. The adjustment torque is used for adjusting mechanical impedance. The mechanical impedance defines a relationship between steering torque and steering angle of the steering axis on the basis of the steering quantity generated by the driver power calculator 23. The load estimator 21, the basic load quantity calculator 22, the target calculator 27, the deviation calculator 28, and the controller 29 together with each other functions as a command value generation unit. The command value generation unit generates a command value and controls an operation of the motor 6 corresponding to the command value using the adjustment torque generated by the adjustment torque generation unit.

The load estimator 21 estimates the road surface load on the basis of the basic assist command Tb* (corresponding to the assist torque) and the steering torque Ts. The basic load quantity calculator 22 generates a basic torque Tf*, which is a basic component of a target value for the steering torque, on the basis of the road surface load Tx estimated by the load estimator 21 and the travel speed V of the vehicle.

The driver power calculator 23 calculates a driver power W by multiplying the steering speed by the steering torque Ts. Herein, the steering speed is obtained by multiplying the motor speed ω by the gear ratio of the speed reduction mechanism 6a. Herein, the values of the steering torque Ts and motor speed ω (or steering speed) in a situation where the steering wheel 2 is rotated clockwise are in reverse polarity from the values of the steering torque Ts and motor speed ω (or steering speed) in a situation where the steering wheel 2 is rotated counterclockwise. Further, it is assumed that a neutral position of the steering wheel 2 is a position in which the steering torque Ts=0. In this case, the value of the steering torque Ts in a situation where the steering wheel 2 is rotated clockwise from the neutral position is in reverse polarity from the value of the steering torque Ts in a situation where the steering wheel 2 is rotated counterclockwise from the neutral position. When the vehicle is traveling normally with a road gripped by the tires, the neutral position is a position in which the vehicle moves straight ahead. When the vehicle spins due to over-steering, the neutral position is a position in which the tires skid sideways. It is assumed that the polarity of the steering torque Ts is positive when the steering wheel 2 is rotated clockwise and the polarity is negative when the steering wheel 2 is rotated counterclockwise.

When the steering torque Ts and the motor speed ω have same polarity, the driver power W is positive and this positive driver power W is obtained by rotating the steering wheel in one direction from the neutral position. When the steering torque Ts and the motor speed ω have different polarities, the driver power W is negative and this driver power W is obtained by rotating back the steering wheel from a rotated state. When the driver power W is equal to zero, the steering wheel is retained by the driver without further rotation. That is, when the driver power W is equal to zero, the steering wheel is in a retained state. Hereinafter, rotating back of the steering wheel 2 from the rotated state may also be referred to as returning the steering wheel 2 for distinguishing the rotating from the rotating back.

In other words, when the steering wheel is rotated either clockwise or counterclockwise from the neutral position, the steering torque Ts and the motor speed ω are in the same polarity, and thus the driver power W has a positive value. When the steering wheel is rotated and then held in a fixed position, the motor speed ω is equal to zero, and thus the driver power is equal to zero. When the held steering wheel is rotated back, the motor speed ω is in reverse polarity from the polarity when the steering wheel was rotated in one direction before the rotate-back. In this case, the steering torque Ts and the motor speed ω have different polarities. Thus, the driver power W has a negative value. The steering torque Ts increases with an increase in deviation of the tires from the traveling direction. The motor speed ω increases when the steering wheel is rotated sharply. The absolute value of the driver power W increases with an increase in degree or amount of above-described operations.

The steering speed is proportional to the motor speed ω. Therefore, the motor speed ω may be used as a value indicating the steering speed. Hence, a value obtained by multiplying the motor speed ω by the steering torque Ts may be used as the driver power W.

The differentiator 261 generates a motor acceleration α, which corresponds to the steering acceleration, by differentiating the motor speed ω, which corresponds to the steering speed.

The rigidity adjustment amount calculator 24 generates a rigidity adjustment torque Tk* on the basis of the driver power W, the estimated load Tx, and the vehicle speed V. The rigidity adjustment torque Tk* is an adjustment component included in a target steering torque Ts* and is used to adjust the sense of rigidity of the steering mechanism 100 that is given to the driver during steering. The viscosity adjustment amount calculator 25 generates a viscosity adjustment torque Tc* on the basis of the driver power W, the motor speed ω, and the vehicle speed V. The viscosity adjustment torque Tc* is an adjustment component (adjustment torque) included in the target steering torque Ts* and is used to adjust the sense of viscosity of the steering mechanism 100 that is given to the driver during steering. The inertia adjustment amount calculator 26 generates an inertia adjustment torque Ti* on the basis of the driver power W and the motor acceleration α. The inertia adjustment torque Ti* is an adjustment component included in the target steering torque Ts* and is used to adjust the sense of inertia of the steering mechanism 100 that is given to the driver during steering.

The target calculator 27 calculates the target steering torque Ts* by adding together the basic torque Tf*, the rigidity adjustment torque Tk*, the viscosity adjustment torque Tc*, and the inertia adjustment torque Ti*. The deviation calculator 28 calculates a torque deviation, which is the difference between the steering torque Ts and the target steering torque Ts*. The controller 29 may include a differentiator and an integrator. The controller 29 generates an output that is used to adjust the sense transmitted to the driver during the operation of the steering wheel. Herein, the sense transmitted to the driver includes a sense corresponding to the road surface load and a feel corresponding to a steering quantity.

In order to generate the basic assist command Tb*, which is used to generate the assist torque (or an assist amount) that provides the sense of transmission corresponding to the road surface load and the feel corresponding to the steering quantity, the controller 29 performs a control on the basis of the torque deviation so that the torque deviation is reduced to zero, that is, the steering torque Ts follows the target steering torque Ts*. Herein, torque deviation is the difference between the steering torque Ts and the target steering torque Ts*.

Figure 4:
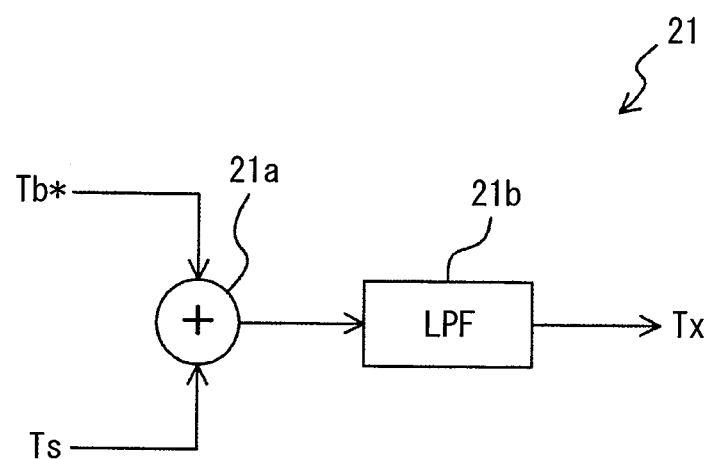
FIG. 4 is a diagram illustrating a configuration of a load estimator.

As illustrated in FIG. 4, the load estimator 21 includes an adder 21a and a low-pass filter (LPF) 21b. The adder 21a adds the steering torque Ts to the basic assist command Tb*. The LPF 21b extracts, from the result of addition, frequency components corresponding to a band that are not higher than a predetermined frequency. The load estimator 21 outputs the frequency components extracted by the LPF 21b as the estimated load Tx. Under normal conditions, the driver drives the vehicle mainly on the basis of steering reaction force information having a frequency of not higher than 10 Hz. Therefore, the LPF 21b passes (extracts) frequency components not higher than approximately 10 Hz and cuts off frequency components higher than 10 Hz.

The basic load quantity calculator 22 generates a component included in the target steering torque Ts*. The component generated by the basic load quantity calculator 22 is used to enable the driver to feel the heaviness or lightness of a steering wheel operation depending on the road surface reaction force. The component generated by the basic load quantity calculator 22 is also used to properly increase, that is, provide an appropriate gradient for the driver's steering reaction force or steering torque in response to an increase in the road surface reaction force. In practical use, a map defining the target steering torque Ts* with respect to the estimated load Tx and the vehicle speed V is prepared for the basic load quantity calculator 22 in the present embodiment. Therefore, the basic load quantity calculator 22 generates the target steering torque Ts* on the basis of the map.

The rigidity adjustment amount calculator 24 includes a rigidity component calculator (RIGIDITY COMPONENT CALCULATE) 24a and a multiplier 24b. Based on the driver power W and the vehicle speed V, the rigidity component calculator 24a uses a prepared rigidity adjustment map to generate a gain K, which is a value corresponding to a rigidity component of mechanical impedance, for adjusting the sense of rigidity or the sense of resilience that is felt by the driver during steering wheel operation. The multiplier 24b generates the rigidity adjustment torque Tk* by multiplying the estimated load Tx by the gain K. In other words, the gain K is an adjustment gain for the estimated road surface load Tx.

Figure 5A:
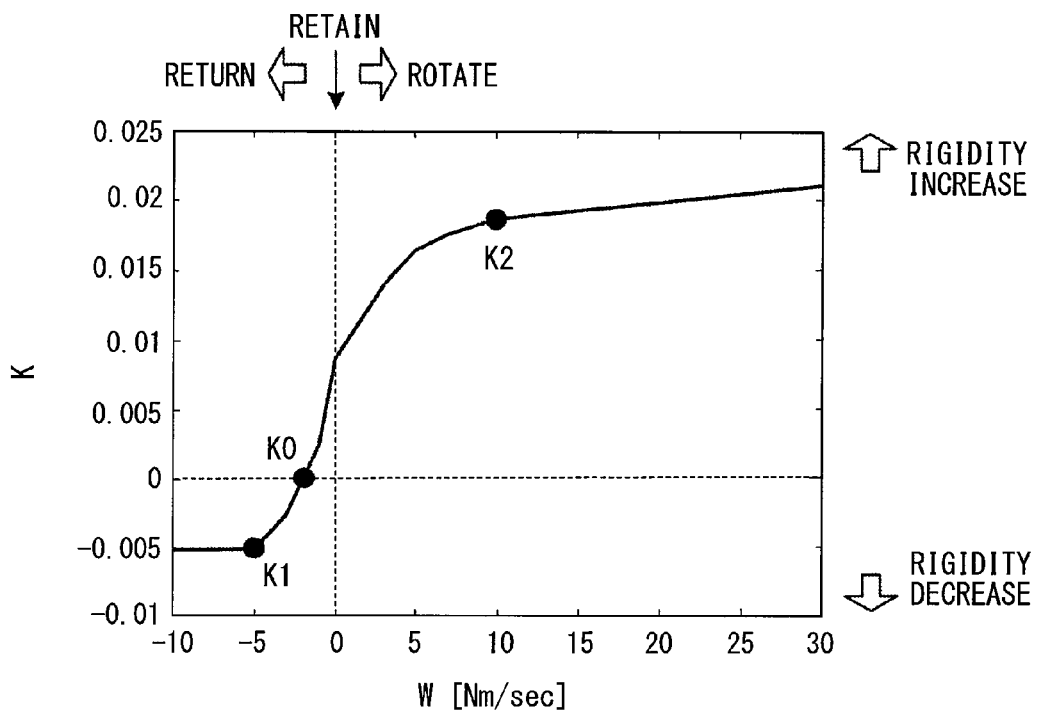
FIG. 5A is a graph exemplifying characteristics of a rigidity adjustment map.

An example of the rigidity adjustment map is shown in FIG. 5A. The rigidity adjustment map is set so that the gain K has a predetermined value larger than zero when the driver power W is equal to zero. Herein, driver power W is equal to zero means that the steering wheel is retained by the driver. The gain K increases when the driver power W increases in a positive direction by rotating the steering wheel from the retained state. Herein, increase of gain K means increase of rigidity. Further, the gain decreases when the driver power W increases in a negative direction by rotating back the steering wheel from the retained state. After the gain becomes zero, a minus gain increases with an increase of the driver power W in the negative direction. The rigidity adjustment map is set so that the increase and decrease of the gain K changes in moderate manner when the absolute value of the driver power W increases. On the negative side in particular, the gain K remains constant when the driver power W is equal to or lower than a predetermined value. It should be noted that the map illustrated in FIG. 5A relates to a case where the vehicle speed V remains constant. In reality, the characteristics illustrated in FIG. 5A vary with the vehicle speed V. More specifically, when the steering wheel is rotated in one direction (W>0), the characteristics are such that the resulting gain K (rigidity) increases with a decrease in the vehicle speed V. When, in contrast, the steering wheel is rotated back (W<0), the characteristics remain substantially constant irrespective of the vehicle speed V.

The viscosity adjustment amount calculator 25 includes a viscosity component calculator (VISCOSITY COMPONENT CALCULATE) 25a and a multiplier 25b. Based on the driver power W and the vehicle speed V, the viscosity component calculator 25a uses a prepared viscosity adjustment map to generate a viscosity component C for adjusting the sense of viscosity that is felt by the driver during steering wheel operation. The multiplier 25b generates the viscosity adjustment torque Tc* by multiplying the motor speed ω by the viscosity component C. As described above, the motor speed ω corresponds to the steering speed.

Figure 6A:
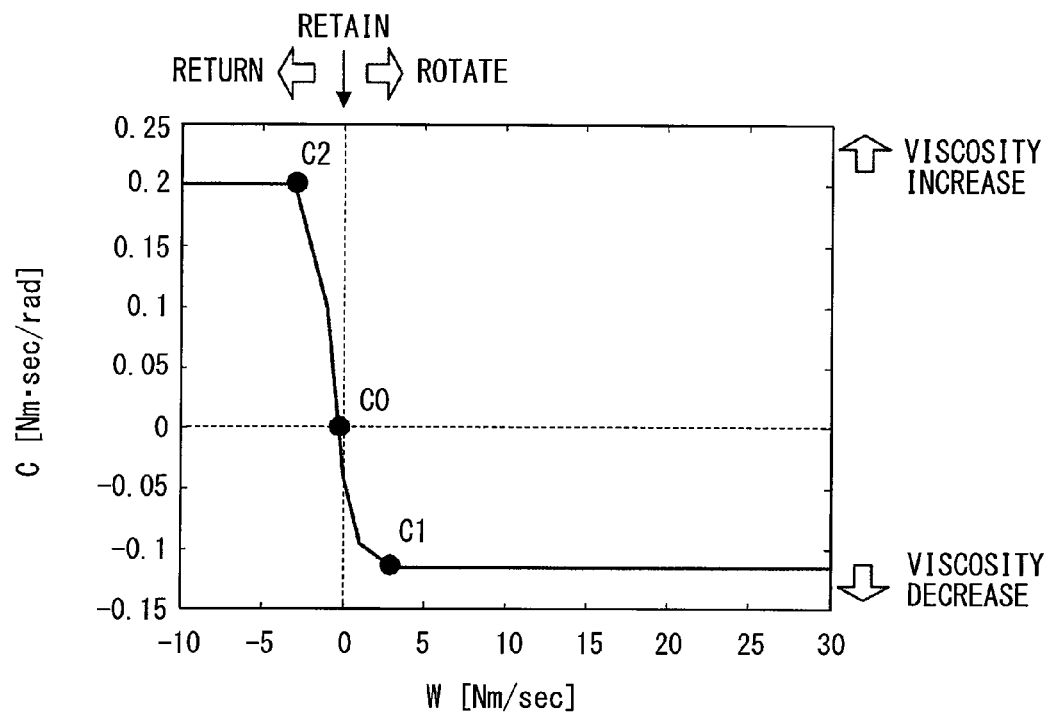
FIG. 6A is a graph exemplifying characteristics of a viscosity adjustment map.

An example of the viscosity adjustment map is illustrated in FIG. 6A. The viscosity component C is equal to zero when the driver power W is equal to zero. The driver power W is equal to zero means that the steering wheel is retained by the driver at a position without rotation. The viscosity adjustment map is set so that the viscosity component C decreases when the driver power W increases in a positive direction by rotating the steering wheel from the retained state, and remains constant when the driver power W is equal to or higher than a predetermined value. Further, the viscosity adjustment map is set so that the viscosity component C increases when the driver power W increases in a negative direction by rotating back the steering wheel from the retained state, and remains constant when the driver power W is equal to or lower than a predetermined value. The map illustrated in FIG. 6A shows a case where the vehicle speed V remains constant. In reality, the characteristics illustrated in FIG. 6A vary with the vehicle speed V. More specifically, the characteristics vary so as to obtain a great viscosity component C on the whole when the vehicle speed V is low, and the rate of such variation is higher when the steering wheel is rotated back (W<0) than when the steering wheel is rotated (W>0).

The inertia adjustment amount calculator 26 includes an inertia component calculator (INERTIA COMPONENT CALCULATE) 26a and a multiplier 26b. Based on the driver power W, the inertia component calculator 26a uses a prepared inertia adjustment map to generate an inertia component I for adjusting the sense of inertia that is felt by the driver during steering wheel operation. The multiplier 26b calculates the inertia adjustment torque Ti* by multiplying the motor acceleration α generated by the differentiator 261 by the inertia component I.

Figure 7A:
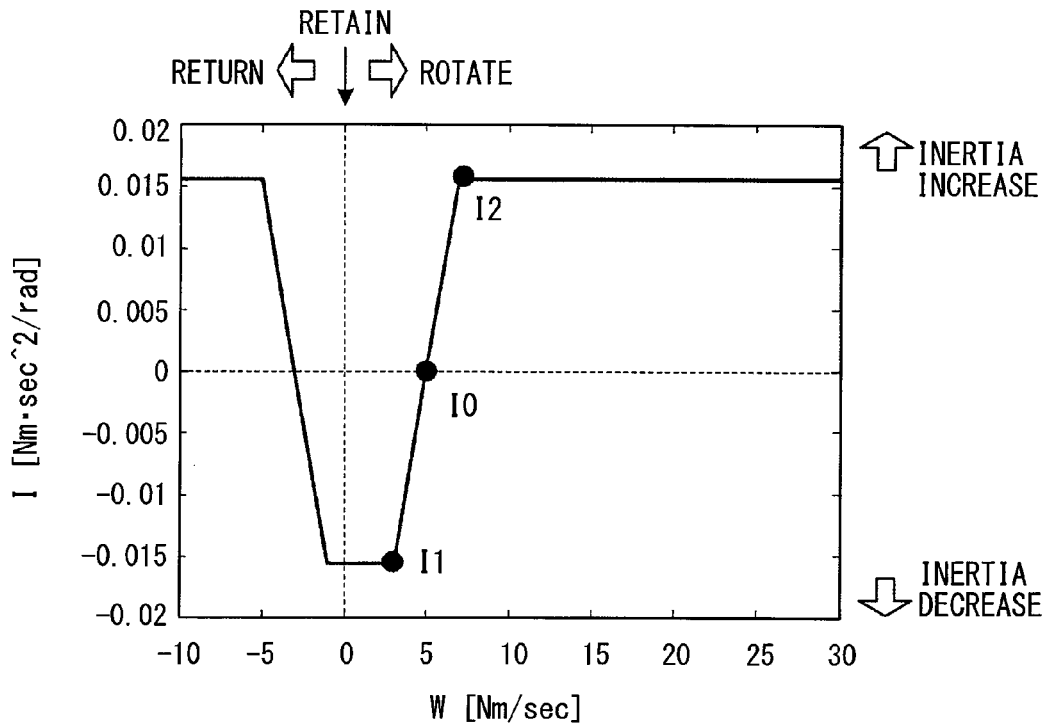
FIG. 7A is a graph exemplifying characteristics of an inertia adjustment map.

An example of the inertia adjustment map is illustrated in FIG. 7A. The inertia component I has a constant negative value within a fine operation region. Herein, the fine operation region is a region in which an operation amount of the steering wheel has a very small value smaller than a predetermined threshold. The fine operation region includes a case where the driver power W is equal to zero, that is, the retained state of the steering wheel. The inertia component I has a constant positive value when the driver power W is equal to or higher than a predetermined rotation-side value set to be higher than the upper limit of the fine operation region. The inertia component I has a constant positive value when the driver power W is equal to or lower than a predetermined rotation-back-side value set to be lower than the lower limit of the fine operation region. Further, the inertia adjustment map is set so that the inertia component I increases with an increase in the absolute value of the driver power W when the driver power W is within a range from the upper limit of the fine operation region to the predetermined rotation-side value. The inertia adjustment map is also set so that the inertia component I increases with an increase in the absolute value of the driver power W when the driver power W is within a range from the lower-limit value of the fine operation region to the predetermined rotation-back-side value. Here, the driver power W is used as a parameter that varies the inertia component I. Alternatively, the vehicle speed V may be used in addition to the driver power W, as is the case with the gain K and the viscosity component C.

The mechanical impedance including rigidity component, viscosity component, and inertia component defines the relationship between force F applied to an object and an object displacement amount x. The relationship is expressed by the following equation (1).

$$Kx+C\dot{x}+I\ddot{x}=F \qquad \text{EQUATION (1)}$$

Here, x represents a steering angle, that is, motor rotation angle. The first-order derivative of the steering angle represents a steering speed, that is, motor speed ω. The second-order derivative of the steering angle represents a steering acceleration, that is, motor acceleration α. In other words, the rigidity adjustment amount calculator 24, the viscosity adjustment amount calculator 25, and the inertia adjustment amount calculator 26 determine, under Equation (1), the torque required to adjust the feeling to be sensed by the driver during steering wheel operation. In the present embodiment, the gain K corresponding to the rigidity component is used instead of the rigidity component because the rigidity adjustment torque Tk* is calculated by using the estimated load Tx instead of the steering angle x. The relationship between the steering angle x and the gain K can easily be determined from a relational expression indicative of the characteristics of the steering mechanism 100.

As described above, the electric power steering system 1 is configured so that the basic assist unit 20 generates the basic assist command Tb*, which controls the motor 6 that acts as a source of assist torque generation, according to a component that transmits reaction force corresponding to the road surface load (estimated load Tx) to the driver and according to a component that adjusts the mechanical impedance of the steering mechanism 100 on the basis of the driver power W.

Consequently, the electric power steering system 1 is capable of accurately providing the driver who performs the steering wheel operation with the sense corresponding to the road surface load and a feeling corresponding to the steering state. Further, the driver power W is capable of distinguishing different steering states, such as rotating the steering wheel, rotating back the steering wheel, and retaining the steering wheel. Further, the driver power W capable of distinguishing different steering states is used as a parameter that varies the mechanical impedance. This eliminates the necessity of changing a control scheme in response to each steering state change. As a result, the feeling provided to the driver can be fine-adjusted by a simple control.

In the electric power steering system 1, the rigidity component calculator 24*a* uses the rigidity adjustment map exemplified in FIG. 5A. Hence, the rigidity increases when the driver power W is positive, that is, the rigidity increases when the steering wheel is rotated from the retained state. Therefore, the feeling given to the driver can be properly increased or become heavy when the steering wheel is gradually rotated from the retained state. Further, the driver power W increases when the rigidity degree increases in response to a rapid and sharp operation of the steering wheel. Therefore, by using the rigidity adjustment map, an appropriate response can be given to the driver on the basis of the strength of force applied by the driver to the steering wheel for rotating the steering wheel.

When the driver power W is negative, that is, when the steering wheel is rotated back from the retained state, the rigidity decreases. In this case, the driver can be provided with a feeling in which rotating the steering wheel back is performed in a moderate manner. The effect of giving such a feeling to the driver is remarkable particularly when the gain K is a negative value.

In a conventional apparatus, the rigidity is varied with the steering angle, and in this case, the rigidity cannot be varied between a case of rotating the steering wheel and a case of rotating back the steering wheel. Therefore, even if setup is performed to give an appropriate response to the driver when the steering wheel is rotated, the rigidity remains at a high value, that is, the resilient reaction force remains at a strong level when the steering wheel is rotated back. Thus, the steering wheel quickly returns to a previous position. In the present disclosure, the electric power steering system 1 varies the rigidity, that is, the gain K on the basis of the driver power W. This makes it possible to provide different rigidities depending on whether the steering wheel is rotated or rotated back.

Besides, there is a special situation where the steering wheel 2 is rotated back in the direction of decreasing the steering torque Ts in a steering state for switching to counter steering in the event of over steering. When such an action is performed to avoid a hazard, even a slight difference in the feel will significantly affect the operation of the driver. In this connection, the driver power W is set such that a negative value indicative of rotating the steering wheel back is generated when the above-described special rotating-back operation is performed. Therefore, even when an action is performed to avoid a hazard, an appropriate feel can be given to the driver. This enables the driver to take an appropriate action for avoiding a dangerous circumstance.

In the above electric power steering system 1, the viscosity component calculator 25*a* uses the viscosity adjustment map exemplified in FIG. 6A. This ensures that the viscosity decreases when the driver power W is positive, that is, the viscosity decreases when the steering wheel is rotated by the driver. Therefore, the sense of viscosity, that is, the sense of stickiness resulting from the motor operated to turn the steering wheel is eliminated to give a proper, comfortable feel to the driver. The effect of giving such a feel to the driver is remarkable particularly when the viscosity component C is set to a negative value.

The viscosity increases when the driver power W is negative, that is, when the steering wheel is rotated back. Therefore, the steering wheel is rotated back in a moderate manner to achieve improved convergence. In other words, a comfortable sense of rotating the steering wheel and excellent convergence during rotating back the steering wheel can be both achieved by adjusting the viscosity component C on the basis of the driver power W.

In the above electric power steering system 1, the inertia component calculator 26*a* uses the inertia adjustment map exemplified in FIG. 7A. This ensures that a natural feel can be given to the driver because an extra sense of inertia, which results from motor inertia, is eliminated when the driver power W is equal to zero (that is, when the steering wheel is held) or become equal to a value within the fine operation region (during fine steering from a state where the steering wheel is retained or at an initial stage of rotating the steering wheel or rotating the steering wheel back).

Further, when the absolute value of the driver power W has a value greater than the fine operation region (when the steering wheel is greatly rotated or rotated back), an appropriate inertia is given to the driver and accordingly a feel of a reaction force component based on inertia force can be provided to the driver.

A fine steering operation performed in a state where the steering wheel is retained is an action that accounts for the greater part of actual driving. Such an action is considered to be an important element when the feel of the driver is to be adjusted. When the mechanical impedance is adjusted on the basis of the driver power W so that the region of a fine operation performed in a state where the steering wheel is retained is adjusted separately from a different steering region, a more accurate feeling can be properly given to the driver.

Figure 5B:
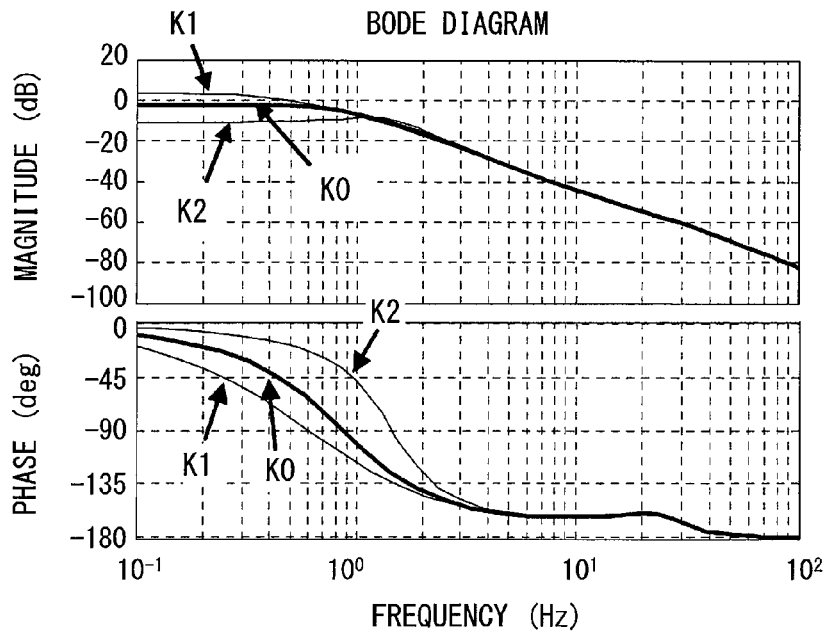
FIG. 5B is a Bode diagram illustrating how transmission characteristics ranging from a steering torque to a steering angle are changed when a gain corresponding to a rigidity component is varied as indicated in the rigidity adjustment map.
Figure 6B:
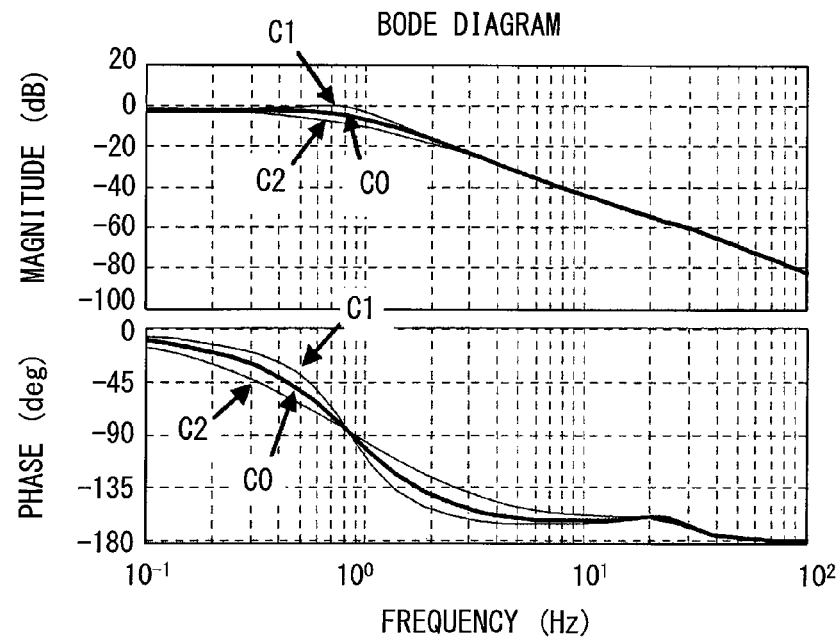
FIG. 6B is a Bode diagram illustrating how transmission characteristics ranging from the steering torque to the steering angle are changed when a viscosity component is varied as indicated in the viscosity adjustment map.
Figure 7B:
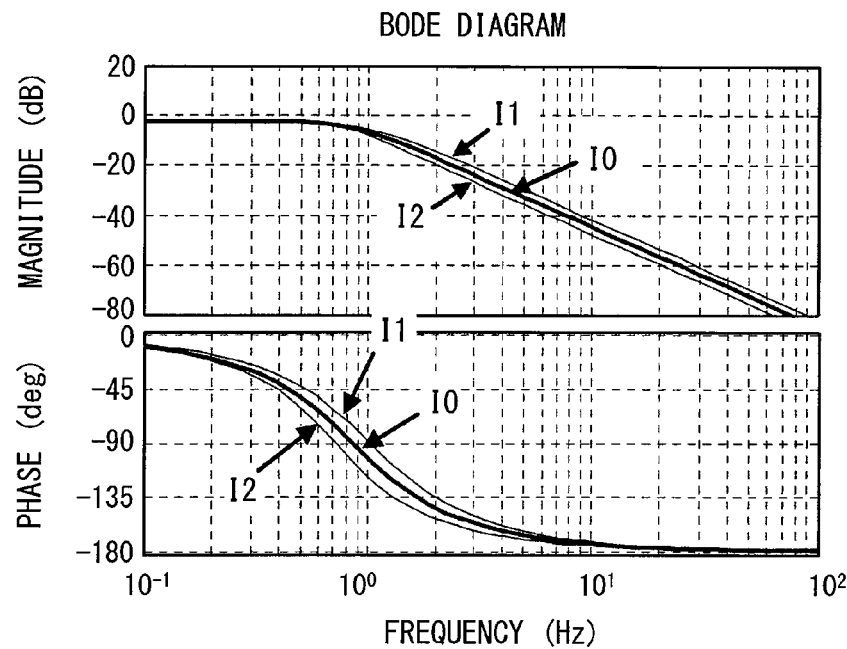
FIG. 7B is a Bode diagram illustrating how transmission characteristics ranging from the steering torque to the steering angle are changed when an inertia component is varied as indicated in the inertia adjustment map.

FIGS. 5B, 6B, and 7B are Bode diagrams obtained from simulation in which changes in the mechanical impedance of the steering mechanism 100 with respect to changes in the gain K corresponding to the rigidity component, the viscosity component C, and the inertia component I are expressed as transmission characteristics ranging from the steering torque Ts to the steering angle.

FIG. 5B illustrates transmission characteristics that are obtained when the viscosity component C and the inertia component I are fixed and the gain K is respectively set to K0, K1, and K2 as indicated in FIG. 5A. As is obvious from FIG. 5B, a portion of the transmission characteristics in which the features of the rigidity component are expressed, that is, a steady-state gain, changes with an increase or a decrease of the gain K.

FIG. 6B illustrates transmission characteristics that are obtained when the inertia component I and the gain K corresponding to the rigidity component are fixed and the viscosity component C is respectively set to C0, C1, and C2 as indicated in FIG. 6A. As is obvious from FIG. 6B, a portion of the transmission characteristics in which the features of the viscosity component are expressed, that is, a gain in the vicinity of breakpoint frequency, changes with an increase or a decrease of the viscosity component C.

FIG. 7B illustrates transmission characteristics that are obtained when the viscosity component C and the gain K corresponding to the rigidity component are fixed and the inertia component I is respectively set to I0, I1, and I2 as indicated in FIG. 7A. As is obvious from FIG. 7B, a portion of the transmission characteristics in which the features of the inertia component are expressed, that is, a gain having a frequency higher than the breakpoint frequency, changes with an increase or a decrease of the inertia component I.

Rigidity, viscosity, and inertia component adjustment maps illustrated in FIGS. 5A to 7B are merely examples for description. These maps may be properly set for obtaining desired characteristics as necessary.

OTHER EMBODIMENTS

In the foregoing embodiment, the driver power W, which is the product of the steering torque Ts and steering speed (motor speed ω), is used as a parameter that varies the mechanical impedance. As another example, the parameter may alternatively be a steering quantity that is determined by multiplying a first physical quantity by a second physical quantity. The first physical quantity increases or decreases depending on the rotation angle of the steering axis. The second physical quantity increases or decreases depending on the rotation speed of the steering axis. Herein, the rotation speed is the steering speed of the steering axis. As the first physical quantity, for example, a yaw rate, a lateral acceleration, or a steering angle may be used instead of the steering torque Ts. As the second physical quantity, the displacement rate of a portion that is displaced in coordination with the steering wheel may be used.

In the foregoing embodiment, the assist torque command Ta to be supplied to the current FB unit 42 is obtained by adding the correction torque command Tr generated by the correction unit 30 to the basic assist command Tb* generated by the basic assist unit 20. As another example, the basic assist command Tb* may be directly used as the assist torque command Ta without correcting the basic assist command Tb* using the correction unit 30. In this case, the correction unit 30 may be omitted.

In the foregoing embodiment, all of the rigidity component, the viscosity component, and the inertia component are adjusted as the mechanical impedance. As another example, at least one or at least two of the rigidity components, the viscosity component, and the inertia component may be adjusted as the mechanical impedance.

In the foregoing embodiment, the load estimator 21 generates the estimated load Tx from the basic assist command Tb* and the steering torque Ts. As another example, the applied current Im detected by the current FB unit 42 may be directly used instead of the basic assist command Tb*.

In the foregoing embodiment, the basic torque Tf* is generated from the estimated torque Tx. As another example, the basic torque Tf* may be generated from the steering angle.

In the foregoing embodiment, the basic torque Tf* and the mechanical impedance adjustment torques Tk*, Tc*, Ti* are separately determined and then added together to generate the target steering torque Ts*. Alternatively, as described in JP 4232471 B2, the present disclosure may be applied to a system that determines the target steering torque Ts* based on the steering angle by using a standard steering model in which the mechanical impedance is reflected. In this instance, the mechanical impedance used in the standard steering model may be adjusted on the basis of a steering quantity. In the present disclosure, the driver power W is used as an example of the steering quantity.

The foregoing embodiment has been described on the assumption that the present disclosure is applied to an electric power steering (EPS) system. The present disclosure may be applied to a system other than EPS system. For example, the present disclosure may alternatively be applied to a steer-by-wire system in which a steering wheel is mechanically separated from steered wheels. In this instance, the target steering torque Ts* may be determined by adding together the rigidity adjustment torque Tk*, the viscosity adjustment torque Tc*, and the inertia adjustment torque Ti* without using the basic torque Tf*.

Further, the present disclosure may be implemented not only in the form of the above-described steering control apparatus, but also in various other forms for permitting a computer to function as various portions of the steering control apparatus, such as a program or a steering control method.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A steering control apparatus that controls steering characteristics by controlling a motor to output an assist torque, the assist torque being generated corresponding to a steering torque applied to a steering axis that is coupled to a steering member, the steering control apparatus comprising:
   a steering quantity generation unit, using a processor, generating a steering quantity indicative of an operation performed on the steering member;
   an adjustment torque generation unit, using a processor, generating an adjustment torque and adjusting a mechanical impedance corresponding to the adjustment torque, and the mechanical impedance defining a relationship between a steering torque of the steering axis and a steering angle of the steering axis corresponding to the steering quantity generated by the steering quantity generation unit; and
   a command value generation unit, using a processor, generating a command value and controlling the motor according to the command value using the adjustment torque generated by the adjustment torque generation unit, the steering quantity being a physical quantity that has different values at least in a state of rotating the steering member, a state of returning the steering member, or a state of retaining the steering member, and the steering quantity indicating an operation amount of rotating the steering member or an operation amount of returning the steering member.

2. The steering control apparatus according to claim 1, wherein
   the command value generation unit further generates a target steering torque that at least includes the adjustment torque, and
   the command value is a value that controls the steering torque to follow the target steering torque.

3. The steering control apparatus according to claim 2, wherein
   the target steering torque includes a basic torque that is calculated based on the assist torque.

4. The steering control apparatus according to claim 3, wherein
   the basic torque has a value corresponding to a road surface load, and the road surface load is estimated based on the assist torque and the steering torque applied to the steering member.

5. The steering control apparatus according to claim 1, wherein
the steering quantity is a product of a first physical quantity and a second physical quantity,
the first physical quantity increases or decreases corresponding to the rotation amount of the steering axis, and
the second physical quantity increases or decreases corresponding to a rotation speed of the steering axis.

6. The steering control apparatus according to claim 5, wherein
the first physical quantity is provided by the steering torque,
the second physical quantity is provided by the rotation speed of the steering axis, and
the steering quantity is provided by a driver power that is defined as a product of the steering torque and the rotation speed of the steering axis.

7. The steering control apparatus according to claim 1, wherein
the adjustment torque generation unit adjusts at least one of a rigidity component, a viscosity component, or an inertia component as the mechanical impedance.

8. The steering control apparatus according to claim 7, wherein
the adjustment torque generation unit adjusts the rigidity component,
the rigidity component is an adjustment gain for a road surface load estimated based on the assist torque and the steering torque,
when the steering quantity has the value representing the state of returning the steering member, the rigidity component has a negative value or has a value that decreases with an increase of the operation amount, and
when the steering quantity has the value representing the state of rotating the steering member, the rigidity component has a positive value or has a value that increases with an increase of the operation amount.

9. The steering control apparatus according to claim 7, wherein
the adjustment torque generation unit adjusts the viscosity component,
the viscosity component is an adjustment gain for a rotation speed of the steering axis,
when the steering quantity has the value representing the state of returning the steering member, the viscosity component has a positive value or has a value that increases with an increase of the operation amount, and
when the steering quantity has the value representing the state of rotating the steering member, the viscosity component has a negative value or has a value that decreases with an increase of the operation amount.

10. The steering control apparatus according to claim 7, wherein
the adjustment torque generation unit adjusts the inertia component,
the inertia component is an adjustment gain for an angular acceleration of the steering axis,
when the steering quantity has a value within a predefined fine operation region, the inertia component has a negative value,
when the steering quantity has a value out of the fine operation region, the inertia component has a positive value, and
the fine operation region includes a retained state of the steering member.

* * * * *